United States Patent [19]

Uiterwaal et al.

[11] Patent Number: 4,710,387

[45] Date of Patent: Dec. 1, 1987

[54] NUTRITIONAL SUPPLEMENT PREPARATION INTENDED FOR PREGNANT AND BREAST-FEEDING WOMEN BASED ON MILK CONSTITUENTS AS WELL AS A PROCESS FOR PREPARING IT

[75] Inventors: Dirk J. D. Uiterwaal, Bodegraven; Aart Hersevoort, Nieuwegein, both of Netherlands

[73] Assignee: Melkunte Holland B.V., AE Woerden, Netherlands

[21] Appl. No.: 795,973

[22] Filed: Nov. 7, 1985

[30] Foreign Application Priority Data

Nov. 9, 1984 [NL] Netherlands ............... 8403433

[51] Int. Cl.$^4$ ............ A23C 11/00; A23L 1/302; A23L 1/304
[52] U.S. Cl. ............................. 426/72; 426/74; 426/613; 426/800; 426/801
[58] Field of Search ............... 426/801, 800, 613, 72, 426/74

[56] References Cited

U.S. PATENT DOCUMENTS 3,901,979  8/1975  Nagasawa ............... 426/801
4,216,236  8/1980  Müeller ................... 426/72

OTHER PUBLICATIONS

Proudfit, Normal and Therapeutic Nutrition, N.Y., Macmillan Co., 1961, pp. 232–234.
Pike et al., Nutrition: An Integrated Approach, John Wiley & Sons, N.Y., 1967, pp. 790–794.
Bender, Dietetic Foods, Chem. Pub. Co., N.Y., 1968, pp. 72, 91, 98, 151, 163, 173, 180, 183–187.

Primary Examiner—Jeanette Hunter
Attorney, Agent, or Firm—Buell, Ziesenheim, Beck & Alstadt

[57] ABSTRACT

Nutritional supplement preparation for pregnant and breast-feeding women based on milk constituents for pregnant and breast-feeding women containing 10–20% by weight of protein, 16–28% by weight of fat, 43–65% by weight of carbohydrates, at most 3.5% by weight of moisture and minerals, trace elements and vitamins such as calcium, phosphorus, magnesium, copper, zinc, iodine, iron, vitamin A, vitamin B1, vitamin B6, vitamin C, vitamin D3, vitamin E, niacin and folic acid, and, optionally flavoring and/or colorant as well as a process for preparing said preparation.

18 Claims, No Drawings

NUTRITIONAL SUPPLEMENT PREPARATION INTENDED FOR PREGNANT AND BREAST-FEEDING WOMEN BASED ON MILK CONSTITUENTS AS WELL AS A PROCESS FOR PREPARING IT

The invention relates to a nutritional supplement preparation intended for pregnant and breast-feeding women based on milk constituents.

It is generally known that the nutrition of pregnant and breast-feeding women has to meet higher requirements in respect of all the nutrients (energy, proteins, minerals and vitamins). In most cases, pregnant and breast-feeding women are advised to consume relatively calorie-rich food and more proteins; in milk-producing countries, especially, this complement is based on dairy products, frequently complemented with other supplementary preparations, such as one or more minerals, vitamins and/or iron-containing preparations.

Concerning the requirements as to the quantities of the extra nutrients, there exists a number of generally accepted standards, such as the "recommended daily allowances" (RDA). Such recommendations are in general based on calculations, extrapolations and assumptions. Though some guidelines for advice to the women in question can be derived from these RDA standards, these standards, in their present form, provide no answer to the question of the optimum nutritional supplement.

Hence, a great deal of investigation has been carried out in this field, for example in the field of calories and proteins: the results of the investigation concerning these two very important factors in daily nutrition are not always clear and at times even contradictory, so that it is impossible for nutritional experts to give, on the basis of these investigations, recommendations concerning the nutritional supplement. As regards iron, the problem of an iron supplement as such is complicated by the actual absorption of the iron from the consumed foodstuff. This leads to the conclusion that it will be impossible to provide the necessary quantity of iron by consumption of extra foodstuff during pregnancy in order to prevent iron-deficiency anaemia.

As regards the supplement of other nutrients such as vitamins and other minerals than iron only few precise data are available. Little is also known of the possible effect of the fat composition and of the composition and digestibility of carbohydrates in complementary foodstuffs or preparations.

It is noted that a nutritional supplement for adults and adolescents, i.e. pregnant and breast-feeding women cannot be compared with nutritional preparations for babies. Such preparations for babies have to meet special requirements with respect to the amount of electrolytes, vitamins and trace elements, which may cause e.g. renal disorders. A partly demineralized product for feeding babies is e.g. described in French patent specification No. 2 388 503.

There has now been found a nutritional supplement preparation based on milk constituents intended for pregnant and breast-feeding women, which, compared to whole milk, has a surprisingly advantageous effect on the state of health of pregnant and breast-feeding women and of their babies, which nutritional supplement preparation is characterised in that it contains 10–20% by weight of protein, 16–28% by weight of fat, 43–65% by weight of carbohydrates, at most 3.5% by weight of moisture and one or more minerals, trace elements and vitamins and, optionally, flavouring and/or colorant.

The supplementary preparation according to the invention preferably contains 14–16% by weight of protein, 19–25% by weight of fat, 50–60% by weight of carbohydrates, at most 3.5% by weight of moisture and one ore more minerals, trace elements and vitamins and, optionally, flavouring. As minerals, trace elements and vitamins the preparation according to the invention inter alia preferably contains calcium, phosphorus, magnesium, copper, zinc, iodine, iron, vitamin A, vitamin B1, vitamin B6, vitamin C, vitamin D3, vitamin E as well as niacin (nicotinic acid) and folic acid.

In addition to the abovementioned constituents protein, fat, carbohydrates and water, 100 g of preparation preferably contain 600–1,000 mg of calcium, 400–1,000 mg of phosphorus, 100–165 mg of magnesium, 350–700 $\mu$g of copper, 4–10 mg of zinc, 30–50 $\mu$g of iodine, 10–100 mg of iron, 800–1,500 $\mu$g of vitamin A, 150–450 $\mu$g of vitamin B1, 500–950 $\mu$g of vitamin B6, 10–2,000 mg of vitamin C, 6–16 $\mu$g of vitamin D3, 1.5–20 mg of vitamin E, 2.5–5 mg of niacin and 300–1,000 $\mu$g of folic acid.

The precise adjustment of the constituents of the preparation according to the invention depends on the circumstances of the consumer.

The preparation according to the invention preferably contains 30–55 mg of iron per 100 g of preparation, while the molar ratio of iron to vitamin C is at least about 1:2.

The preparation according to the invention preferably contains, in addition to the abovementioned constituents, so-called micronutrients; this means that 100 g of preparation preferably contain at least 7 $\mu$g of manganese, 50 $\mu$g of fluorine, 30 $\mu$g of chromium, 30 $\mu$g of molybdenum, 0.25 $\mu$g of cobalt, 500 $\mu$g of vitamin B2, 1.5 $\mu$g of vitamin B12, 10 $\mu$g of vitamin H, 20 $\mu$g of vitamin K and 1,000 $\mu$g of pantothenic acid.

Very especially, 100 g of the supplementary preparation according to the invention contain 14.5–15.4 g of protein, 21.0–21.9 g of fat, 54–58 g of carbohydrates, 4.5–5.5 g of ash, a maximum of 3.5 g of moisture, 775–945 mg of calcium, 595–725 mg of phosphorus, 115–145 mg of magnesium, 470–575 $\mu$g of copper, 5.85–7.15 mg of zinc, 55–65 ug of iodine, 38–47 mg of iron, 1,000–1,200 mg of vitamin A, 270–330 $\mu$g of vitamin B1, 650–790 $\mu$g of vitamin B6, 310–370 mg of vitamin C, 9.7–8.9 $\mu$g of vitamin D3, 1.9–2.3 mg of vitamin E, 3–3.6 mg of niacin and 360–440 $\mu$g of folic acid.

The preparation according to the invention preferably contains a flavouring, for example vanilla, citrus (lemon), pineapple, mocha, strawberry or chocolate flavouring, in order to improve the flavour. A suitable colorant may be added.

The fat present in the preparation preferably consists of milk fat and vegetable fat, in particular in a ratio of about 3:7 to 7:3. The vegetable fat contains polyunsaturated fatty acid such as linoleic acid. The nutritional supplement preparation according to the invention preferably contains 4–10% by weight of polyunsaturated fatty acid. The unsaturated fatty acid has an advantageous effect on the state of health of the pregnant and breast-feeding women and of the babies.

The carbohydrates in the preparation according to the invention consist of lactose, which can be replaced entirely or partially by its hydrolysis products, maltodextrins and sucrose. Other carbohydrates customary in foodstuffs can also be used in the preparations according to the invention. The carbohydrates in part act as sweeteners.

The lactose (or the hydrolysis products galactose and glucose), malto-dextrins and sucrose are preferably present in roughly equal amounts in the preparation. It is desirable on the one hand that the lactose should be replaced by its hydrolysis products to the extent of at least about 50% and preferably 75–90%, in order to improve the digestibility of the product and at the same time the absorption of calcium and magnesium and the like, and, on the other hand, it is essential to prevent so-called Maillaird reactions between the monosaccharides glucose and galactose (the reaction products of the lactose hydrolysis) and the aminoacids (mostly lysine) of the protein and to retain the high nutritional value of the milk protein.

The milk constituents present in the preparation according to the invention can be derived from whole milk, skimmed milk, whey, sweet buttermilk, caseinates and the like.

It is surprising that the effect of the nutritional supplement preparation according to the invention is substantially greater than would have been expected on the basis of its individual constituents, so that one can speak of a strong synergistic effect. This synergistic effect manifests itself in a substantially higher calorie efficiency than that found on consumption of customary complete milk. This has the effect that the mean birth weight of the babies increases; there is a weight increase of at least 25% per consumed calorie unit and the occurrence of intra-uterine retardation of the baby's growth is substantially reduced. The preparation according to the invention improves the general state of health of the pregnant and breast-feeding women in that they show a more advantageous weight gain during pregnancy and in that iron-deficiency anaemia is very largely prevented.

The preparation according to the invention is used alongside the usual nutrition. For this purpose, the pulverulent preparation can be mixed with water and consumed as a drink. It is also possible to work the preparation according to the invention into other foodstuffs or dishes, for example blancmange.

Accordingly, the invention also relates to products suitable for consumption and characterised in that they contain the preparation described above.

The nutritional supplement preparation may be prepared according to any procedure known in the art, e.g. by mixing the various ingredients. However, for preparing a nutritional preparation containing at most a small amount of lactose a specific process is provided by the present invention. This process is described in the below. With respect to the presence of lactose in human foodstuffs the following is remarked.

It is generally known that lactose may cause digestive upsets. This lactose intolerance is due to a too low lactase activity in the human digestive tract.

Said low lactase activity may due to ontogenetic factors (indicated as hypolactasia) as well as to pathological factors (indicated as lactase deficiency). Said lactase dificiency may be generated as a congential defect, as a consequence of gastroenteritis or as a consequence of a non-adequate food regimen. Due to the relatively high lactose contents of milk in a number of cases there is a reason to look for a proper solution of said problems, especially with respect to pregnant and breast-feeding woman. The undesired effects of lactose may be avoided by decreasing the percentage of lactose in milk and milk products, e.g. by subjecting said milk to a hydrolysis of lactose. By such a hydrolysis milk components which are very valuable from a food point of view, would become also available for persons having a low lactase activity.

Particularly the calcium supply, which is important for building up the osseous system in the growing period and for maintaining the skeleton in later periods may be secured in this way. From scientific investigations it is known e.g. that there is a correlation between osteoporose, lactase deficiency and a reduced consumption of liquid milk. (vide "consumption of liquid milk" by A. D. Newcomer c.s. Am. Intern. Medic 89, 218–220 1978).

In hydrolyzed milk and milk products lactose is at least partially broken down into the hexoses, glucose and galactose. Particularly monosaccharides react preferably with the amino acid lysine ("Maillard reactions"). In such a reaction, the essential amino acid lysine will loose its important contribution to the npu (net protein utilization) of milk. Said reaction occurs in hydrolysed milk especially during its processing into milkpowder. Moreover, depending on the conditions, said reactions proceed also in the dried product as described a.o. in the thesis of Anders Burvall "Lactose Hydrolysis" (Lund (Sweden), 1978).

Due to said "Maillard reactions" the nutritive value of hydrolysed milk (and milk products) is affected in an inacceptable way. in the usual evaporation processes and drying processes the amount of lysine available may be reduced up to 30 weight percent moreover, it appears that after some months the percentage of lysine in the final product may decrease by up to 50 weight percent. This has been confirmed in applicant's laboratory.

A method of drying a prehydrolysed milk, that results in a powder having a substantially unaffected nutritive value, is freeze-drying (vide Burvall, 1978). However, said method is very expensive due to the high investment and due to the high consumption of energy. Consequently, in general it may not be used in a paying way for the preparation of milk products.

Applicants developed already a process to solve the abovementioned problems. Said process is disclosed in the European patent application No. 108.838 and involves subjecting the milk product as starting material to an ultrafiltration wherein the resulting retentate contains substantially all milk proteins, and the permeate contains substantially all lactose of the starting material, subjecting said permeate to a hydrolysis, concentrating and drying said retentate and said hydrolysed permeate separately and blending said dried products in a selected ration.

Though the products prepared according the said process meet the highest requirements for products being poor in lactose, do not show a Maillard reaction at increased temperatures and contain the full percentage of lysine, it appears that the use of one ultrafiltration step and two drying steps is too expensive to be performed on a commercial scale. It is for that reason that applicants seeked for a more economical process which would yield products substantially identical to the products prepared according to European patent application No. 108.838.

There has now also been found a process for preparing a nutritional supplement preparation on the basis of milk constituents which preparation, compares to complete milk, has a surprisingly advantageous effect on the state of health of pregnant and breast-feeding women and of babies, contains at most a small amount of lactose and shows minimal Maillard reactions.

The present process is characterized in that proteins, optionally carbohydrates and/or fats are recovered from a starting material of the group consisting of whole milk, skimmed milk, whey, sweet buttermilk aand mixtures thereof, and are recombined, in case of whey as starting material with caseinate, optionally with the use of other proteins, carbohydrates and fats to form a preparation containing 10–20% by weight of protein, 16–28% by weight of fat, 43–65% by weight of carbohydrates, at most 3.5% by weight of moisture and minerals, trace elements and vitamens, and, optionally, flavouring and/or colorant.

Preferably the present process is performed by using whey as the starting material and subjecting the lactose contained therein to hydrolysis to form a lactose hydrolysed whey (LHW), then adding fatty material optionally together with carbohydrate(s) to the LHW, concentrating the mixture so obtained, optionally adding a further amount of fatty material and carbohydrate(s), drying the total mixture and, finally, adding protein (caseinate) and minerals, trace elements, vitamins and, optionally, flavouring and/or colorant.

According to a preferred embodiment of the process according to the invention one or more of the minerals, trace elements, vitamins and/or flavouring may be incorporated into the caseinate before said caseinate is added to the other major ingredients of the nutritional preparation. It has appeared that e.g. the mineral salts are more stable if they are pre-mixed with the caseinate. In particular this is the case with salts of iron such as $FeSO_4$, but also with salts of copper.

In case whey is used as the starting material, at most about 20% of the amount of protein in the final composition is in contact with the hydrolysis products. Under these conditions some loss of lysine should be expected. However, in very severe storage tests the loss of lysine mounted up to at most 15% (storage during ten days at 50 degrees Celsius).

These tests show that the preparation obtained according to the process of the invention is not affected seriously by Maillard reactions.

The invention is explained in more detail in the Examples which follow.

EXAMPLE I

In a container 10,000 kg of whey with a dry-material content of 6.3 percent is added, then 10 kg of enzym preparation (hl 50-sturge enzyms) are added to this whey.
24 Hours after dosage of the enzym preparation,
628 kg of cream containing 40 percent fat,
5.31 kg of ferro(II)sulphate.7H$_2$O,
1.76 grams of potassium iodide
are added to the whey.

The product is then pasteurized at 72 centigrades and condensed down to 48 percent of dry material. The mixture thus obtained is then mixed with maltodextrins and maize oil to which 70 mg/kg dl-α-tocopherol is added.

The following mixture ratio is used:

| whey-cream mixture dry material | maltodextrins (5 percent moisture) | maize oil 27.7 |
|---|---|---|
| 100 | 48.6 | |

The mixture is then heated to 55 centigrades, homogenized at 150 mpa—of which 30 mpa in the second stage—heated to 80 centigrades and dried on a filtermat drying installation.

The powder obtained is then mixed with
17.90 kg Ca-caseinate
3.35 kg di-Ca-phosphate-2-hydrate
1.09 kg Mg-sulphate (13% mg)
25.80 kg saccharose
41.62 grams Zn-lactate-2-hydrate
1.74 grams Cu(II)sulphate (35% Cu)
16.784 grams vitamin A acetate 325.000 iu/g
0.324 grams vitamin B1 mononitrate
1.078 grams b6.Hcl
504.738 grams vitamin C
6.471 grams vitamin D3 type 100.000 ug/g
4.918 grams nicotine amide
0.595 grams folic acid
per 100 kg of the powder

EXAMPLE II

About 24 g of the pulverulent preparation according to Table A of Example III were mixed with 85 ml of water. This gave 100 ml of a milk-like drink.

EXAMPLE III

To ascertain the effect of the nutritional supplement preparation according to the invention, use was made of the results of an investigation which was carried out with mildly under-nourished pregnant women which in 1983–1984 visited a number of health centres in Santiago, Chile. The investigation was carried out with three groups of pregnant women. The first group did not use any nutritional supplement preparation (group I). The second group used daily a preparation according to the invention, having the composition given in Table A (group II). The third group used daily whose milk powder of known composition (group III). Variables which influenced the pregnancy were excluded as far as possible (such as very young age of the mother, smoking, alcohol consumption, medical conditions, serious under-nourishment, premature birth and miscarriage) or were controlled (weight of the women before pregnancy, social-economic circumstances, duration of the pregnancy, daily food consumption, consumption of complementary nutrition, iron medication, educational level, anthropometric characteristics).

The women were arbitrarily divided into groups II and III. During the investigation, the control group (group I) was created. This group consisted of women which refused a supplementary preparation. The women in this control group were investigated and controlled in the same manner as in the two other groups.

TABLE A

Composition of the nutritional supplement preparation according to the invention, used in Example I (per 100 g).

| | | |
|---|---|---|
| protein: | 14.5 g | |
| fat: | 21.0 g | |
| milk fat | | −10.5 g |
| vegetable fat | | −10.5 g |
| (linoleic acid) | | (5.25 g) |
| carbohydrates | 56.0 g | |
| lactose (±80% hydrolysed) | | −20.0 g |

TABLE A-continued

Composition of the nutritional supplement preparation
according to the invention, used in Example I (per 100 g).

| | |
|---|---|
| malto dextrins | −18.0 g |
| sucrose | 18.0 g |
| ash: | 4.9 g |
| calcium: | 860 mg |
| phosphorus: | 660 mg |
| magnesium: | 130 mg |
| zinc: | 6.5 mg |
| iron: | 43 mg |
| copper: | 0.52 mg |
| sodium*: | 200 mg |
| potassium*: | 670 mg |
| chloride*: | 440 mg |
| iodine | 60 μg |
| manganese*: | 11.0 μg |
| fluorine*: | 74 μg |
| chromium*: | 43 μg |
| molybdenum*: | 43 μg |
| cobalt*: | 0.4 μg |
| vitamin A | 1,100 μg |
| vitamin B1 | 300 μg |
| vitamin B2* | 770 μg |
| vitamin B6 | 720 μg |
| vitamin B12* | 1.8 mg |
| vitamin C | 340 μg |
| vitamin D3 | 10.8 μg |
| vitamin E | 2.1 mg |
| vitamin H* | 15 μg |
| vitamin K* | 30.4 μg |
| niacin | 3,300 μg |
| folic acid | 400 μg |
| pantothenic acid*: | 1,250 μg |
| energy: | 479 kcal/ 1965 k Joules |
| moisture: | 3.5 g (max) |

The nutrients marked with an * are mean amounts found in the natural constituents. Since they meet the requirements of nutrition of pregnant and breast-feeding women, they were not added to the nutritional supplement preparation.

RESULTS

1. Consumption
2. Weight increase during pregnancy
3. Birth weight
4. Occurrence of iron-deficiency anaemia

1. Consumption 603 women were covered by the complete investigation (75 in group I, 274 in group II and 254 in group III). The groups II and III were divided on the basis of their mean daily consumption. Group IIa and group IIIa consumed 24 g or less of the supplementary preparation and group IIb and IIIb consumed 25 g or more per day of the supplementary preparation. Group IIa consisted of 96 women and group IIb of 178 women. Group IIIa consisted of 93 women and group IIIb of 161 women. The five groups were balanced with one another and subjected to statistical analysis (the so-called ANOVA test, a multiple-variation analysis).

2. Weight increase during pregnancy (Table B)

TABLE B

Mean weight increase (in kg) of the women during pregnancy

| | Group I | Group II a | Group II b | Group III a | Group III b |
|---|---|---|---|---|---|
| Number of women | 75 | 96 | 178 | 93 | 161 |
| Mean weight increase* | 11.70 | 12.80 | 13.0 | 11.50 | 11.40 |

*The differences between group I, groups IIa and IIb and groups IIIa and IIIb are statistically significant (P < 0.05).

3. Birth weight (a) Mean birth weight (Table C)
(b) Percentage of intra-uterine retardation of growth (if the growth of the baby in the womb follows a normal course, this percentage should be low) (Table D).
(c) Calorie efficiency (calculated as the difference in the mean birth weight (g) between group II or III and the control group per kcal of supplementary product consumed daily (Table E)).

TABLE C

Mean birth weight of the babies (g)

| | Group I | Group II a | Group II b | Group III a | Group III b |
|---|---|---|---|---|---|
| Number of women | 75 | 96 | 178 | 93 | 161 |
| Mean birth weight | 2980.40() | 3294.10(*) | 3340.20(***) | 3198.40 | 3200.00 |
| (SD) | (300.04) | (311.41) | (340.10) | (328.20) | (331.10) |

(**) The differences between control group I and the four other groups are statistically significant (P < 0.01)
(***) The differences between groups II and III are statistically significant (P < 0.05).

TABLE D

% of intra-uterine growth retardation (I.U.G.R.)

| | Group I | Group II a | Group II b | Group III a | Group III b |
|---|---|---|---|---|---|
| Number of women | 75 | 96 | 178 | 93 | 161 |
| % of I.U.G.R.* | 85.3 | 15.6 | 7.3 | 28.0 | 24.8 |

*The differences between the five groups are statistically significant (P < 0.01).

TABLE E

Calorie efficiency (calculated as the difference in the mean birth weight (g) between group II or III and group I per kcal of supplementary preparation consumed daily.

| | Group II a | Group II b | Group III a | Group III b |
|---|---|---|---|---|
| Number of women | 96 | 178 | 93 | 161 |
| Calorie efficiency (%) | 3.51 (153.3) | 1.62 (157.4) | 2.29 (100) | 1.03 (100) |

4. Occurrence of iron-deficiency anaemia during pregnancy

TABLE F

Distribution (%) of haemoglobin concentrations (g/100 dl) at the start and at the end of the pregnancy (women from groups IIb and IIIb which did not suffer from anaemia prior to the pregnancy)

| | Start of pregnancy | | End of pregnancy | |
|---|---|---|---|---|
| haemoglobin | II | III | II | III |
| (anaemia) ≦ 11.0 | 0 | 0 | 7.8* | 22.2* |
| 11.1–12.0 | 9.8 | 12.5 | 15.7* | 31.9* |
| 12.1–13.0 | 37.3 | 38.9 | 45.1* | 22.2* |
| ≧13.1 | 52.9 | 48.6 | 31.4* | 23.7* |

*The differences are statistically significant (P 0.05)

CONCLUSIONS

1. The increase in the weight of the women during pregnancy was markedly more favourable in women which used the nutritional supplement preparation according to the invention than in the case of women from control group I and in the case of the group of women which used the whole milk powder.

2. The increase in mean birth weight was markedly greater on consumption of the preparation according to the invention, compared to consumption of whole milk powder both in group IIIa and group IIIb.

3. The reduction in the percentage of intra-uterine growth retardation was much greater on using the preparation according to the invention than in the comparison groups, both group IIIa and group IIIb.

4. The mean birth weight and the percentage of intra-uterine growth retardation were further improved by a higher consumption of the preparation according to the invention. Such a result was not obtained in group III.

5. The energy derived from the preparation according to the invention was converted to a far greater degree into a net weight increase of the newborn baby than in the case of the consumption of whole milk powder.

6. The occurrence of anaemia at the end of the pregnancy was reduced to a very low percentage. The haemoglobin concentration in women not suffering from anaemia was markedly more favourable in the case of the women which used the preparation according to the invention.

We claim:

1. Nutritional supplement preparation intended for pregnant and breast-feeding women based on milk constituents, comprising 10–20% by weight of protein, 16–28% by weight of fat, 43–65% by weight of carbohydrates, at least a part of which is hydrolyzed lactose, at most 3.5% by weight of moisture, and minerals, trace elements and vitamins, and, amounts of flavouring and colorant which do not affect the nutritional character of the supplement.

2. Preparation according to claim 1, comprising 14–16% by weight of protein, 19–25% by weight of fat, 50–60% by weight of carbohydrates, at most 3.5% by weight of moisture, and minerals, trace elements and vitamins and, amounts of flavouring and colorant which do not affect the nutritional character of the supplement.

3. Preparation according to claim 1 or 2, comprising 14.5–15.4% by weight of protein, 21.0–21.9% by weight of fat, 54–58% by weight of carbohydrates, at most 3.5% by weight of moisture, and minerals, trace elements and vitamins and amounts of flavouring and colorant which do not affect the nutritional character of the supplement.

4. Preparation according to claims 1 or 2, further comprising calcium, phosphorus, magnesium, copper, zinc, iodine, iron, vitamin A, vitamin B1, vitamin B6, vitamin C, vitamin D3, vitamin E, niacin and folic acid.

5. Preparation according to claim 4, wherein 100 g of preparation contain 60–1,000 mg of calcium, 400–1,000 mg of phosphorus, 100–165 mg of magnesium, 350–700 µg of copper, 4–10 mg of zinc, 30–50 µg of iodine, 10–100 mg of iron, 800–1,500 µg of vitamin A, 150–450 µg of vitamin B1, 500–950 µg of vitamin B6, 100–2,000 mg of vitamin C, 6–16 µg of vitamin D3, 1.5–20 mg of vitamin E, 2.5–5 mg of niacin and 300–1,000 µg of folic acid.

6. Preparation according to claims 1 or 2, wherein 100 g of preparation contain 30–55 mg of iron.

7. Preparation according to claims 1 or 2, wherein the molar ratio of iron to vitamin C is at least 1:2.

8. Preparation according to claims 1 or 2, wherein 100 g of preparation contain at least 7 µg of manganese, 50 µg of fluorine, 30 µg of chromium, 30 µg of molybdenum, 0.25 µg of cobalt, 500 µg of vitamin B2, 1.5 µg of vitamin B12, 10 µg of vitamin H, 20 µg of vitamin K and 1,000 µg of pantothenic acid.

9. Preparation according to claims 1 or 2, wherein 100 g of preparation contain 14.5–15.4 g of protein, 21.0–21.9 g of fat, 54–58 g of carbohydrates, 4.5–5.5 g of ash, a maximum of 3.5 g of moisture, 775–945 mg of calcium, 595–725 mg of phosphorus, 115–145 mg of magnesium, 470–575 µg of copper, 5.85–7.15 mg of zinc, 55–65 µg of iodine, 38–47 mg of iron, 1,000–1,200 µg of vitamin A, 270–330 µg of vitamin B1, 650–790 µg of vitamin B6, 310–370 mg of vitamin C, 9.7–11.9 µg of vitamin D3, 1.9–2.3 mg of vitamin E, 3–3.6 mg of niacin, 360–440 µg of folic acid.

10. Preparation according to claims 1 or 2, wherein the fat consists of milk fat and vegetable fat.

11. Preparation according to claim 10, wherein the ratio of vegetable fat to milk fat is about 3:7 to 7:3.

12. Preparation according to claims 1 or 2, further comprising 4–10% by weight of polyunsaturated fatty acid.

13. Preparation according to claims 1 or 2, wherein the carbohydrates consist of lactose, its hydrolysis products or mixture thereof and malto-dextrins and sucrose.

14. Preparation according to claim 13, wherein the lactose or its hydrolysis products, malto-dextrins and sucrose are present in approximately equal amounts.

15. Preparation according to claim 13, wherein the lactose is replaced to the extent of about 90% by its hydrolysis products.

16. A process for preparing a nutritional supplement preparation on the basis of milk constituents according to claims 1 or 2, wherein proteins, optionally carbohydrates and/or fats are recovered from a starting material of the group consisting of whole milk, skimmed milk, whey, sweet buttermilk and mixtures thereof, and are recombined, in case of whey as starting material with caseinate, optionally with the use of other proteins, carbohydrates and fats to form a preparation containing 10–20% by weight of protein, 16–28% by weight of fat, 43–65% by weight of carbohydrates, at most 3.5% by weight of moisture, and minerals, trace elements and vitamins, and, amounts of flavouring and colorant which do not affect the nutritional character of the supplement.

17. The process according to claim 16, characterized in that whey is used as starting material and the lactose contained therein is subjected to hydrolysis to form a lactose hydrolysed whey (LHW), then fatty material optionally together with carbohydrate(s) are added to the LHW, the mixture so obtained is concentrated, optionally a further amount of fatty material and carbohydrate(s) are added, the total mixture is dried and, finally caseinate and minerals, trace elements, vitamins and, optionally, flavouring and/or colorant is added.

18. The process according to claim 17, characterized in that one or more minerals, trace elements, vitamins and, optionally, flavouring and/or colorant is mixed with the caseinate before said caseinate is added to the dried mixture of fat and carbohydrates.

* * * * *